US012039362B2

(12) United States Patent
Stoppa

(10) Patent No.: US 12,039,362 B2
(45) Date of Patent: Jul. 16, 2024

(54) PROCESSING INTERRUPT REQUESTS FOR AUTONOMOUS SYSTEMS AND APPLICATIONS

(71) Applicant: NVIDIA Corporation, Santa Clara, CA (US)

(72) Inventor: Igor Stoppa, Vantaa (FI)

(73) Assignee: NVIDIA Corporation, Santa Clara, CA (US)

( * ) Notice: Subject to any disclaimer, the term of this patent is extended or adjusted under 35 U.S.C. 154(b) by 70 days.

(21) Appl. No.: 17/746,366

(22) Filed: May 17, 2022

(65) Prior Publication Data

US 2023/0376343 A1 Nov. 23, 2023

(51) Int. Cl.
*G06F 9/48* (2006.01)
*G06F 9/54* (2006.01)

(52) U.S. Cl.
CPC ............ *G06F 9/4825* (2013.01); *G06F 9/542* (2013.01)

(58) Field of Classification Search
CPC .............................. G06F 9/4825; G06F 9/542
USPC ................................................ 710/369, 269
See application file for complete search history.

(56) References Cited

U.S. PATENT DOCUMENTS

| 4,438,298 | A | * | 3/1984 | Rubin | H04M 3/30 379/90.01 |
| 4,509,044 | A | * | 4/1985 | Yachida | G01D 1/00 73/295 |
| 4,740,898 | A | * | 4/1988 | McKee | B60K 31/047 701/99 |
| 6,523,027 | B1 | * | 2/2003 | Underwood | G06F 9/465 |
| 2002/0107648 | A1 | * | 8/2002 | Gandhi | G01R 22/00 702/66 |
| 2002/0116563 | A1 | * | 8/2002 | Lever | G06F 13/26 710/260 |
| 2003/0103089 | A1 | * | 6/2003 | Ramani | G06T 19/00 715/848 |
| 2004/0236879 | A1 | * | 11/2004 | Croxford | G06F 13/24 710/48 |
| 2006/0075402 | A1 | * | 4/2006 | Neiger | G06F 9/45558 718/1 |
| 2007/0094491 | A1 | * | 4/2007 | Teo | G06F 21/577 713/153 |
| 2007/0203719 | A1 | * | 8/2007 | Kenagy | H04L 63/0428 705/26.1 |
| 2007/0245054 | A1 | * | 10/2007 | Wang | G06F 9/4825 713/1 |
| 2008/0189788 | A1 | * | 8/2008 | Bahl | H04L 63/1416 726/25 |
| 2012/0279304 | A1 | * | 11/2012 | Lee | G01P 15/0891 73/514.16 |
| 2017/0323403 | A1 | * | 11/2017 | Johnson | G06Q 10/06314 |
| 2019/0347155 | A1 | * | 11/2019 | Chevalier | G06F 11/0778 |
| 2020/0051318 | A1 |   | 2/2020 | Muthler et al. | |

(Continued)

OTHER PUBLICATIONS

Structured Computer Organization third edition by Andrew S. Tanenbaum. (Year: 1990).*

(Continued)

*Primary Examiner* — Paul R. Myers
(74) *Attorney, Agent, or Firm* — Davis Wright Tremaine LLP

(57) ABSTRACT

In various examples, a timer component that generates an event when an interrupt request has not yet been cleared within at least a predetermined amount of time.

39 Claims, 11 Drawing Sheets

(56) References Cited

U.S. PATENT DOCUMENTS

2020/0288306 A1\* 9/2020 Do .................... H04W 12/37
2022/0292228 A1\* 9/2022 Johnson ................ G06F 21/85

OTHER PUBLICATIONS

ECMA International, "Standard ECMA-404: The JSON Data Interchange Syntax," Retrieved from, "https://www.ecma-international.org/wp-content/uploads/ECMA-404_2nd_edition_december_2017.pdf," Dec. 2017, 16 pages.

Society of Automotive Engineers On-Road Automated Vehicle Standards Committee "Taxonomy and Definitions for Terms Related to Driving Automation Systems for On-Road Motor Vehicles", Standard No. J3016-201806, dated Jun. 15, 2018.

Society of Automotive Engineers On-Road Automated Vehicle Standards Committee, "Taxonomy and Definitions for Terms Related to Driving Automation Systems for On-Road Motor Vehicles," Standard No. J3016-201609, issued Jan. 2014, revised Sep. 2016, 30 pages.

\* cited by examiner

PROCESSING INTERRUPT REQUESTS FOR AUTONOMOUS SYSTEMS AND APPLICATIONS

TECHNICAL FIELD

At least one embodiment pertains to systems and methods of processing interrupt requests for autonomous systems and applications. For example, at least one embodiment pertains to a circuit that limits an amount of time in which an operating system may handle an interrupt request. In at least one embodiment, the circuit is included in a System on a Chip ("SoC") that implements various novel techniques described herein. By way of another example, at least one embodiment pertains to an autonomous vehicle including such an SoC.

BACKGROUND

Automotive Safety Integrity Level ("ASIL") is a risk classification system for the functional safety of road vehicles defined by International Organization for Standardization ("ISO") 26262 Functional Safety Standard. There are four risk classification levels in this risk classification system identified as ASIL-A, ASIL-B, ASIL-C, and ASIL-D, with ASIL-D being the highest risk classification level. Thus, ISO 26262 places higher safety requirements on components specified as ASIL-D than on components specified with a lower risk classification level (such as ASIL-B).

Sometimes, it may be necessary to use a component capable of operating at a lower safety level (such as ASIL-B) than is desired (such as ASIL-D). When this is the case, systems and/or methods may be used to help ensure that a system that includes such a component nevertheless satisfies applicable safety standards.

BRIEF DESCRIPTION OF THE DRAWINGS

The present systems and methods for processing interrupt requests in autonomous (and semi-autonomous) machines and applications are described in detail below with reference to the attached drawing figures, wherein.

DETAILED DESCRIPTION

Figure 1:
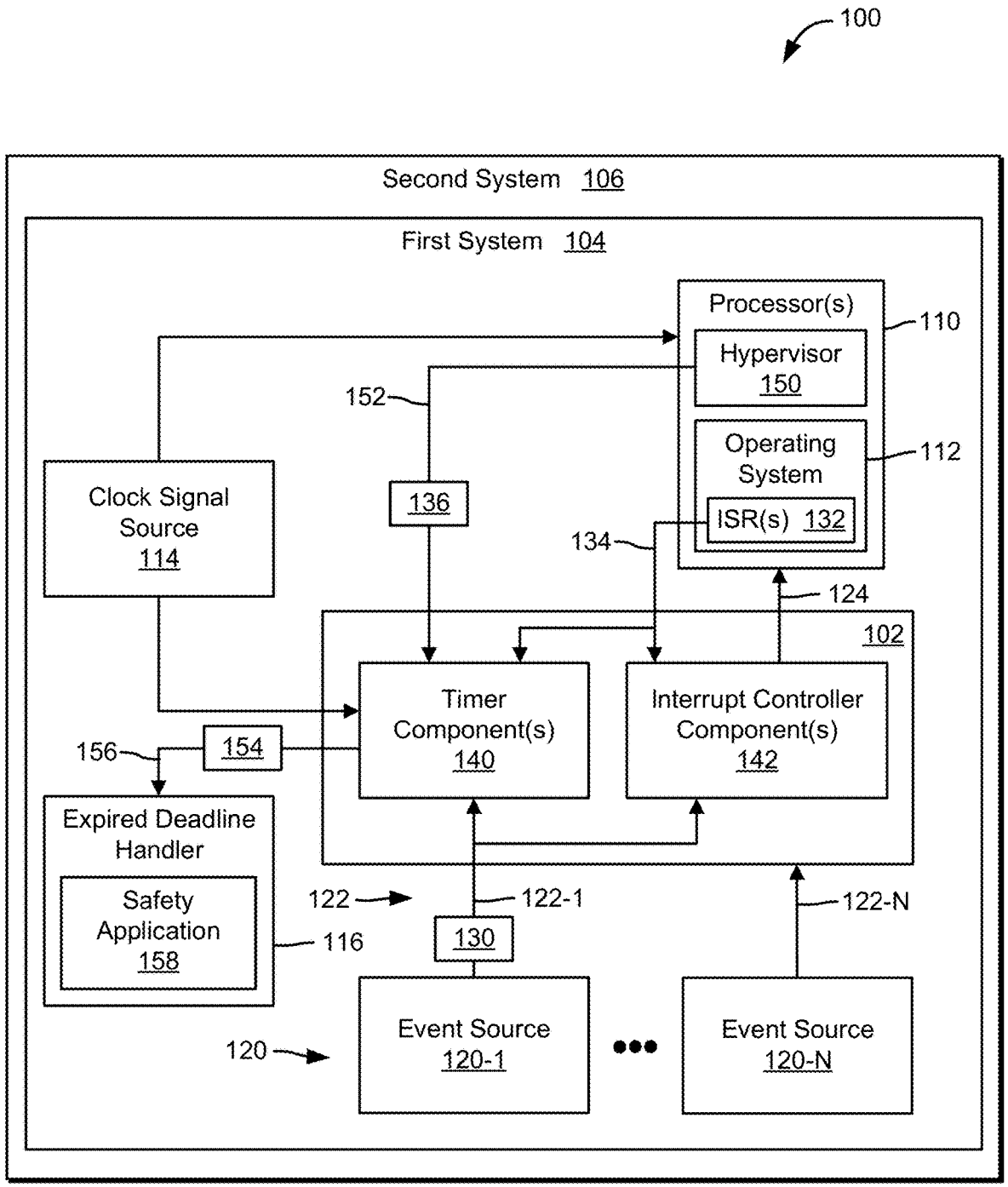
FIG. 1 is an illustration of a block diagram of an example system that includes a deadline interrupt controller, in accordance with some embodiments of the present disclosure.

Systems and methods are disclosed related to processing interrupt requests for autonomous (and semi-autonomous) systems and applications. Although the present disclosure may be described with respect to an example autonomous vehicle 700 (alternatively referred to herein as "vehicle 700" or "ego-machine 700," an example of which is described with respect to FIGS. 7A-7D), this is not intended to be limiting. For example, the systems and methods described herein may be used by, without limitation, non-autonomous vehicles, semi-autonomous vehicles (e.g., in one or more adaptive driver assistance systems ("ADAS")), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to ensuring timely processing of interrupt requests in autonomous systems and application, this is not intended to be limiting, and the systems and methods described herein may be used in augmented reality, virtual reality, mixed reality, robotics, security and surveillance, autonomous or semi-autonomous machine applications, and/or any other technology spaces where interrupt request processing may be executed.

The systems and methods described herein may be used by, without limitation, non-autonomous vehicles, semi-autonomous vehicles (e.g., in one or more ADAS), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence ("AI"), light transport simulation (e.g., ray-tracing, path tracing, etc.), collaborative content creation for three-dimensional ("3D") assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines ("VMs"), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Systems and methods are disclosed related to processing interrupt requests, and particularly to ensuring interrupt requests are processed in a timely manner. To help prevent an interrupt handler (e.g., an operating system, an interrupt service routine, and/or the like) from taking too long and/or failing to clear an interrupt request, a deadline interrupt controller may be used detect when more than a predetermined amount of time has elapsed since the interrupt handler received notification of the interrupt request. The deadline interrupt controller may report that the predetermined amount of time has elapsed to an event handler (referred to as an expired deadline handler) that may take one or more corrective actions. The deadline interrupt controller helps ensure that interrupt requests (e.g., possible failures) do not go undetected.

By way of a non-limiting example, the deadline interrupt controller may be used to ensure timely handling of interrupt requests by an operating system capable of operating at a lower safety level (such as ASIL-B) than is desired (such as ASIL-D). In such embodiments, the deadline interrupt controller may be characterized as providing a timer component operating at the desired (higher) safety level (e.g., in a safe context) that sets a constraint (e.g., a time limit), which must be satisfied by the operating system. In such embodiments, together the operating system and the deadline interrupt controller satisfy the safety requirements specified by the desired higher safety level with respect to the handling of interrupt requests.

With reference to FIG. 1, FIG. 1 is an illustration of a block diagram of an example system 100 that includes a deadline interrupt controller 102, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the components, features, and/or functionality of the system 100 may be similar to those of example autonomous vehicle 700 of FIGS. 7A-7D and/or example computing device 800 of FIG. 8.

Referring to FIG. 1, the deadline interrupt controller 102 may be implemented as one or more circuits and may operate within a first system 104 that may itself be implemented as one or more circuits, e.g., a System on a Chip ("SoC"). The first system 104 may be a component of another second system 106, such as an autonomous vehicle, an electrical device (e.g., a laptop, a tablet, a cellular telephone, a smartphone, etc.), a robotic device, and/or the like. The first system 104 includes one or more processors 110 (e.g., a main core) that execute(s) an operating system 112. By way of non-limiting examples, the processor(s) 110 may be implemented as a main central processing unit ("CPU") complex, one or more microprocessors, one or more microcontrollers, one or more graphics processing units ("GPUs"), one or more data processing units ("DPUs"), and/or the like.

The first system 104 may include a clock signal source 114, an event handler (referred to as an expired deadline handler) 116, and/or event sources 120. However, in at least one embodiment, the clock signal source 114, the expired deadline handler 116, and/or the event sources 120 may be one or more components of another system that are connected to the first system 104, e.g., by one or more conductors (not shown). The conductor(s) (not shown) may each be implemented by a hardware line, a trace, a wire, and/or the like. For ease of illustration, the event sources 120 have been illustrated and will be described as including event sources 120-1 to 120-N. However, the first system 104 may include any number of event sources, including a single event source.

Each of the event sources 120 may generate one or more events (e.g., an asynchronous event or a synchronous event) that is/are each referred to as an interrupt request when the interrupt request is communicated (e.g., as a change of state of a hardware line) to the deadline interrupt controller 102. Each of the event sources 120 may communicate interrupt requests to the deadline interrupt controller 102 over one or more conductors 122 (e.g., hardware line(s), trace(s), wire(s), and/or the like). For ease of illustration, in FIG. 1, the event source 120-1 is illustrated as being connected to the deadline interrupt controller 102 by a conductor 122-1 and the event source 120-N is illustrated as being connected to the deadline interrupt controller 102 by a conductor 122-N. By way of a non-limiting example, in FIG. 1, the event source 120-1 is illustrated communicating an interrupt request 130 to the deadline interrupt controller 102 over the conductor 122-1. However, each of the event sources 120 may communicate one or more interrupt requests, each like the interrupt request 130, to the deadline interrupt controller 102 over one or more of the conductors 122.

The event sources 120 may be implemented as any component that generates interrupt requests that are communicated to an interrupt handler (e.g., the operating system 112). For example, one or more of the event sources 120 may be implemented as proximity sensors (e.g., of an autonomous vehicle). By way of a non-limiting example, such a proximity sensor may generate an interrupt request when the proximity sensor detects an autonomous vehicle is within a predefined distance of an obstacle. In such an example, it is important that the interrupt request be handled within the predetermined amount of time to avoid a potential collision between the autonomous vehicle and the obstacle.

At least some of the interrupt requests (e.g., the interrupt request 130) sent to the deadline interrupt controller 102 by the event sources 120 are sent by the deadline interrupt controller 102 to the processor(s) 110 over one or more conductors 124 (e.g., hardware line(s), trace(s), wire(s), and/or the like). The operating system 112 executed by the processor(s) 110 may handle each interrupt request and clear the interrupt request from the deadline interrupt controller 102 after the interrupt request has been handled. For example, the operating system 112 may include at least one interrupt service routine 132 ("ISR") that handles the interrupt requests and clears the interrupt requests from the deadline interrupt controller 102. The ISR(s) 132 may send a signal over one or more conductors 134 (e.g., hardware line(s), trace(s), wire(s), and/or the like) to the deadline interrupt controller 102 that instructs the deadline interrupt controller 102 to clear a particular interrupt request after the particular interrupt request has been handled by the ISR(s) 132. The deadline interrupt controller 102 clears the interrupt request in response to this instruction.

The deadline interrupt controller 102 helps ensure that the interrupt requests are handled by the operating system 112 within one or more predetermined amounts of time 136 (e.g., 100 milliseconds ("msec"), 200 msec, and/or the like). For example, each of the event sources 120 or each of the conductors 122 may be assigned at least one of the predetermined amounts of time 136. In at least one embodiment, at least some of the event sources 120 may be assigned a different predetermined amount of time than at least one other of the event sources 120. By way of another non-limiting example, at least some of the conductors 122 may be assigned a different predetermined amount of time than at least one other of conductors 122.

The timer component(s) 140 may receive a clock signal from the clock signal source 114 (e.g., a clock operating in the first system 104) that each of the timer component(s) 140 uses to determine when its respective predetermined amount of time has elapsed. In other words, the timer component(s) 140 may be driven by a known clock (e.g., the clock signal source 114), which cannot be disabled by the operating system 112. The processor(s) 110 may also receive the clock signal from the clock signal source 114.

At least one of the systems 100, 104, and 106 may be required to satisfy one or more safety standards. An example of such a safety standard includes ISO 26262. ISO 26262 defines functional safety for electrical systems through their lifecycle and aims to address possible hazards that might be caused by unexpected (e.g., malfunctioning) behavior exhibited by such systems in autonomous vehicles. The safety standard(s) may define, at least in part, how a particular system is implemented and what processes the particular system will perform to help ensure expected behavior occurs.

In at least one embodiment, the operating system 112 may operate at a safety integrity level (e.g., ASIL-B) that is below that specified by the safety standard(s) (e.g., ASIL-D) that apply to the first system 104. In such embodiments, the deadline interrupt controller 102 may help the operating system 112 satisfy the safety integrity level (e.g., ASIL-D) specified by the safety standard(s) by ensuring that either (1) the operating system 112 clears a particular interrupt request within an applicable predetermined amount of time or (2) the deadline interrupt controller 102 reports the failure of the operating system 112 to clear the particular interrupt request to the expired deadline handler 116, which may take one or more corrective actions. Thus, a system designer may be able to establish that the implementation, verification, and related processes of at least one of the systems 100, 104, and 106 satisfy the safety integrity level specified by the applicable safety standard(s). In other words, the deadline interrupt controller 102 may help increase confidence that an unexpected behavior by the system 100 (e.g., violation) will be detected, if an unexpected behavior occurs. By helping to ensure that a possible failure associated with an interrupt request (e.g., the interrupt request 130) will not go undetected for longer than the predetermined amount of time, the deadline interrupt controller 102 allows the operating system 112 to operate at a desired safety integrity level with respect to handling interrupt requests. As such, the deadline interrupt controller 102 allows the first system 104 to operate at a higher risk classification level with respect to handling interrupt requests than the operating system 112 may be capable of achieving alone.

The deadline interrupt controller 102 may be characterized as including one or more timer components 140 and at least one interrupt controller component(s) 142. The timer component(s) 140 may each be configured or programmed with a respective predetermined amount of time. The timer component(s) 140 each determine when the respective predetermined amount of time has elapsed (e.g., by counting down from the predetermined amount of time). The timer component(s) 140 may include a different timer component for each of the event sources 120 and/or each of the conductors 122. Thus, different ones of the timer component(s) 140 may use different predetermined amounts of time. In other words, the timer component(s) 140 may each be paired to a separate one (or more) of the conductor(s) 122 (referred to as an interrupt line) that has been assigned one of the predetermined amount(s) of time 136. Each of the conductor(s) 122 may communicate the occurrence of a different hardware event that is associated with a different predetermined amount of time.

The timer component(s) 140 may each start when the timer component receives an interrupt request (e.g., the interrupt request 130). The timer component(s) 140 may each store a predetermined amount of time in a first memory location (e.g., a deadline register) after the predetermined amount of time is assigned to the timer component. In some embodiments, just before the timer component starts, the timer component loads the predetermined amount of time into a second memory location (e.g., into a countdown register) from the first memory location (e.g., the deadline register) and begins counting down. The interrupt request is also received by the interrupt controller component(s) 142. Each of the timer component(s) 140 stop or deactivate when the interrupt request is cleared from the interrupt controller component(s) 142 (e.g., by the operating system 112). By way of a non-limiting example, the timer component may poll the interrupt controller component(s) 142 to determine when a particular interrupt request has been cleared. By way of another non-limiting example, the operating system 112 and/or the interrupt controller component(s) 142 may inform the timer component when the particular interrupt request has been cleared.

The deadline interrupt controller 102 may be configured by a configuration component that operates at an adequate risk classification level (e.g., as required by the safety standard(s)). By way of a non-limiting example, the configuration component may be a hypervisor 150, which is a virtual machine manager that assigns hardware resources (e.g., to different operating system instances being executed by the processor(s) 110) and may itself perform functions. For example, the hypervisor 150 may provide the predetermined amount(s) of time 136 to the timer component(s) 140 over one or more conductors 152 (e.g., hardware line(s), trace(s), wire(s), and/or the like). The hypervisor 150 may provide the predetermined amount(s) of time 136 to the timer component(s) 140 at boot time. The predetermined amount of time provided to a particular one of the timer component(s) 140 may be based at least in part on which of the event sources 120 is attached to the particular timer component. Thus, those of the timer component(s) 140 connected to different ones of the timer component(s) 140 (e.g., sensors) may be programmed with different predetermined amounts of time. The hypervisor 150 may read the predetermined amount(s) of time 136 from a configuration file or otherwise receive the predetermined amount(s) of time 136 from a system integrator. The hypervisor 150 may be executed by the processor(s) 110 (e.g., a main core) but is separate from and unaffected by the operating system 112. The hypervisor 150 may have initiated execution of a virtual machine (by the processor(s) 110) that executes the operating system 112. Further, the hypervisor 150 may manage execution of the virtual machine that executes the operating system 112.

As mentioned herein, the timer component(s) 140 may each store the predetermined amount of time received from the hypervisor 150 in a first memory location (e.g., a deadline register). In some embodiments, just before the timer component starts, the timer component loads the predetermined amount of time into a second memory location (e.g., into a countdown register) from the first memory location (e.g., the deadline register) and begins counting down.

If the operating system 112 fails to clear a particular interrupt request within the predetermined amount of time, a particular one of the timer component(s) 140 that started after the particular interrupt request was received will generate a deadline-expired event 154 and send it to the expired deadline handler 116 over at least one conductor 156 (e.g., hardware line(s), trace(s), wire(s), and/or the like). The expired deadline handler 116 handles the deadline-expired event 154 (e.g., performs one or more corrective actions) and may execute a safety application 158 that returns the first and/or second systems 104 and 106 to a safe state. For example, the safety application 158 executed by the expired deadline handler 116 may turn off the first system 104 (e.g., return control of an autonomous vehicle to a human driver). By way of another non-limiting example, if the first system 104 includes redundant components, the expired deadline handler 116 may transfer functionality to another one of the redundant components. By way of another non-limiting example, the expired deadline handler 116 may reset the first system 104 and/or some of the components (e.g., the operating system 112, the deadline interrupt controller 102, the event source that generated the interrupt request, and/or the like) within the first system 104.

The expired deadline handler 116 may be implemented as an external error manager (e.g., executing on another core, another chip, and/or the like) that operates at a risk classification level (e.g., ASIL D) required by the one or more safety standards. By way of another non-limiting example, the expired deadline handler 116 may be implemented by the operating system 112 (executing by the processor(s) 110). In such embodiments, the conductor(s) 156 that communicates the deadline-expired event 154 to the operating system 112 may be implemented as one or more non-maskable interrupt ("NMI") lines, and the deadline-expired event 154 may be handled by the ISR(s) 132, if the ISR(s) 132 operates at a risk classification level (e.g., ASIL D) required by the applicable safety standard(s). The NMI line(s) each conduct an interrupt request that the operating system 112 cannot ignore. By way of yet another non-limiting example, the expired deadline handler 116 may be implemented by the hypervisor 150 (executing by the main core), which may trap and handle the deadline-expired event 154.

Figure 2:
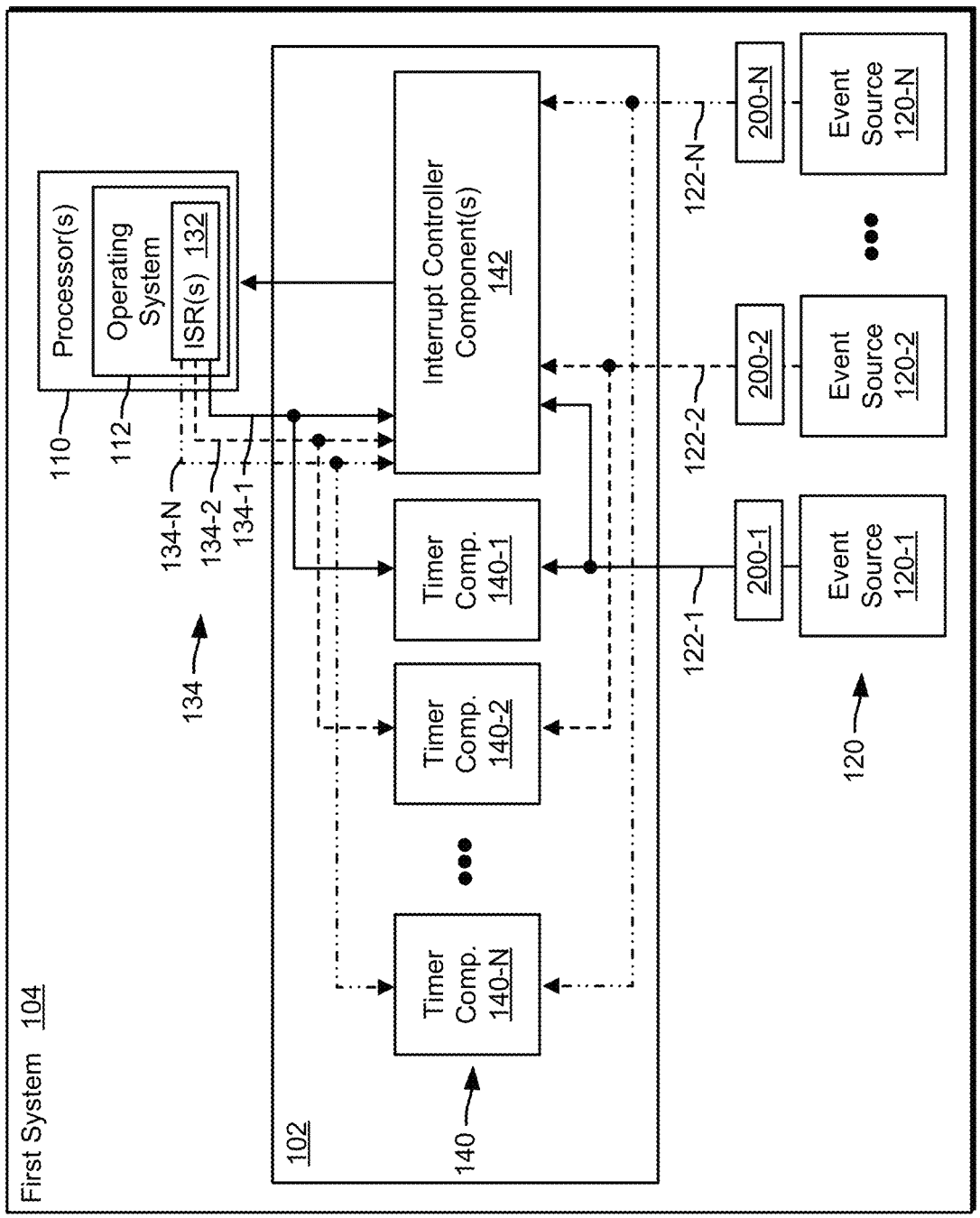
FIG. 2 is an illustration of a block diagram of the deadline interrupt controller of FIG. 1, in accordance with some embodiments of the present disclosure.

FIG. 2 is an illustration of a block diagram of the deadline interrupt controller of FIG. 1, in accordance with some embodiments of the present disclosure. In the embodiment illustrated in FIG. 2, the first system 104 includes a different one of the timer component(s) 140 for each of the conductors 122-1 to 122-N. Thus, in FIG. 2, the first system 104 includes the timer components 140-1 to 140-N that receive interrupt requests over conductors 122-1 to 122-N, respectively. In the example illustrated, the event sources 120-1 to 120-N send interrupt requests 200-1 to 200-N, respectively, to the interrupt controller component(s) 142 via the conductors 122-1 to 122-N, respectively. Additionally, the event sources 120-1 to 120-N send the interrupt requests 200-1 to 200-N, respectively, to the timer components 140-1 to 140-N, respectively, via the conductors 122-1 to 122-N, respectively. Thus, in this example, the deadline interrupt controller 102 has been illustrated receiving the interrupt requests 200-1 to 200-N from the event sources 120-1 to 120-N, respectively, over the conductors 122-1 to 122-N, respectively. When the operating system 112 (e.g., the ISR(s) 132) clears the interrupt requests 200-1 to 200-N, the operating system 112 notifies the timer components 140-1 to 140-N, respectively, and the interrupt controller component(s) 142 over conductors 134-1 to 134-N, respectively. As mentioned herein, the hypervisor 150 (see FIGS. 1, 4, and 5) may provide the predetermined amount(s) of time 136 (see FIG. 1) to the timer components 140-1 to 140-N over the conductor(s) 152 (see FIG. 1). The timer components 140-1 to 140-N use the predetermined amount(s) of time 136 to determine when the operating system 112 has taken too long to clear one of the interrupt requests 200-1 to 200-N, respectively. As explained above, whenever one of the timer components 140-1 to 140-N determines that the operating system 112 has taken too long to clear one of the interrupt requests 200-1 to 200-N, respectively, the timer component sends a deadline-expired event (e.g., the deadline-expired event 154 illustrated in FIGS. 1, 4, and 5) to the expired deadline handler 116 (see FIGS. 1, 4, and 5).

Figure 3:
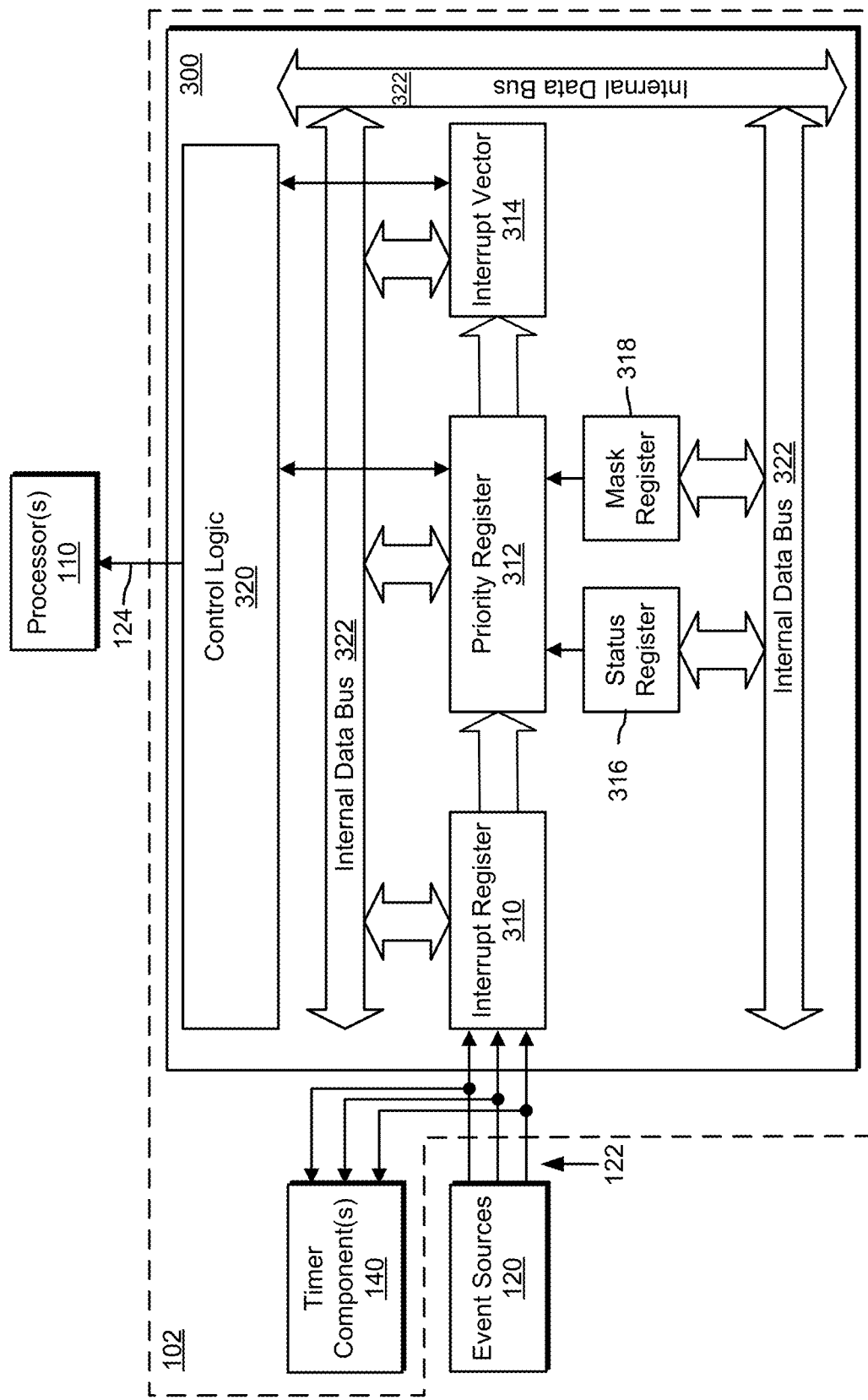
FIG. 3 is an illustration of a block diagram of the deadline interrupt controller of FIG. 1 including an example interrupt controller, in accordance with some embodiments of the present disclosure.

FIG. 3 is an illustration of a block diagram of the deadline interrupt controller 102 including an example interrupt controller 300, in accordance with some embodiments of the present disclosure. The interrupt controller 300 may be used to implement each of the interrupt controller component(s) 142. In the embodiment illustrated in FIG. 3, the interrupt controller 300 has been implemented primarily in hardware. Referring to FIG. 3, the interrupt controller 300 includes an interrupt register 310, a priority register 312, an interrupt vector 314, a status register 316, a mask register 318, control logic 320, and one or more internal data buses 322. The internal data bus(es) 322 interconnect(s) the components of the interrupt controller 300.

The interrupt register 310 functions as an interface between the event sources 120 and the interrupt controller 300. The interrupt register 310 is connected to the conductors 122 and receives the interrupt requests from the event sources 120. The interrupt register 310 may store any of the interrupt requests that the control logic 320 has not yet acknowledged. After the control logic 320 sends an acknowledgement of a particular interrupt request to the event source that sent the particular interrupt request to the interrupt controller 300, that particular interrupt request is forwarded to the priority register 312. Some interrupt requests are ignored by the interrupt controller 300 and not acknowledged. The interrupt register 310 forwards those unacknowledged interrupt requests to the mask register 318.

The priority register 312 stores a priority assigned to each interrupt request that has been received and is not yet been cleared. For example, the priority register 312 may store the priorities assigned to the conductors 122. By way of a non-limiting example, the control logic 320 may assign the priorities to the conductors 122. Referring to FIG. 2, if the conductors 122 (e.g., hardware lines) are each associated with a priority, those priorities may be used to pause one or more of the timer components 140-1 to 140-N associated with the conductors 122-1 to 122-N, respectively. For example, if the conductor 122-1 is associated with a higher priority than the conductors 122-2 to 122-N, the timer component 140-1, which is associated with the conductor 122-1, may pause the timer components 140-2 to 140-N (which are associated with the conductors 122-2 to 122-N having a lower priority) when the higher priority timer component 140-1 is activated. The higher priority timer component 140-1 may cause at least one of the lower priority timer components 140-2 to 140-N to un-pause (or resume counting down) when the higher priority timer component 140-1 is stopped or deactivated by clearance of the higher priority interrupt request 200-1.

Referring to FIG. 3, the interrupt vector 314 is a data structure that associates each of the interrupt requests with an interrupt handler. The interrupt handler(s) may each be implemented as the operating system 112 and/or one of the ISR(s) 132 illustrated in FIGS. 1, 2, 4, and 5. Referring to FIG. 3, the status register 316 stores the status of the interrupt requests. The status indicates which of the interrupt requests has been cleared. The control logic 320 controls the functionality of the interrupt controller 300. After the operating system 112 handles one of the interrupt requests, the operating system 112 may clear a flag in the status register 316 associated with the cleared interrupt request. Thus, the processor(s) 110 may be connected to the status register 316 and operable to clear flags within the status register 316.

Referring to FIG. 1, the interrupt controller component(s) 142 and the timer component(s) 140 may each be implemented using hardware, firmware, software, or combination thereof. For example, the deadline interrupt controller 102 may be implemented as a purely hardware component, a semi-virtual component, or a fully-virtual component. In FIGS. 1-3, the deadline interrupt controller 102 has been implemented as a purely hardware component. In such embodiments, the interrupt controller component(s) 142 may be implemented as a regular or conventional interrupt controller (e.g., like the interrupt controller 300 illustrated in FIG. 3) with the timer component(s) 140 positioned to receive interrupt requests that are also received by the interrupt controller component(s) 142. For example, one or more (e.g., all) of the components of the deadline interrupt controller 102 may be implemented on one or more silicon substrate. Nevertheless, software may interact with the hardware of the interrupt controller component(s) 142. For example, as mentioned herein, the hypervisor 150, which is implemented at least in part by software, may provide the predetermined amount(s) of time 136 (e.g., one each) to the timer component(s) 140. Referring to FIG. 1, as mentioned herein, the timer component(s) 140 may receive a clock signal from the clock signal source 114 that each of the timer component(s) 140 uses to determine when its respective predetermined amount of time has elapsed.

Figure 4:
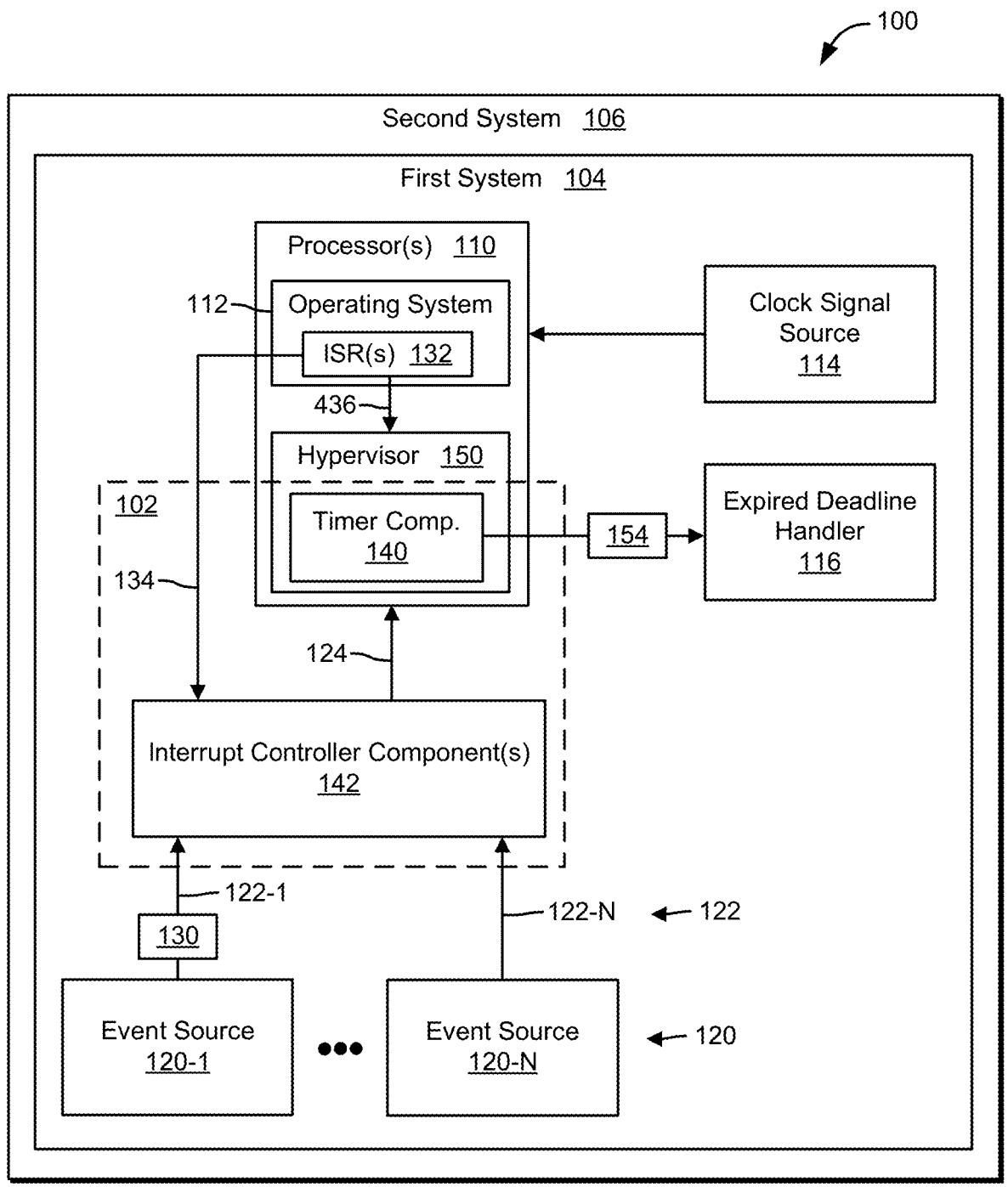
FIG. 4 is an illustration of a block diagram in which the deadline interrupt controller has been implemented as a semi-virtual component, in accordance with some embodiments of the present disclosure.

FIG. 4 is an illustration of a block diagram in which the deadline interrupt controller 102 has been implemented as a semi-virtual component, in accordance with some embodiments of the present disclosure. In the embodiment illustrated in FIG. 4, the hypervisor 150 may implement at least a portion of the deadline interrupt controller 102 as a software wrapper around the interrupt controller component(s) 142, which may be implemented as a hardware component (e.g., like the interrupt controller 300 illustrated in FIG. 3). By way of a non-limiting example, the interrupt controller component(s) 142 may be implemented as a regular or conventional interrupt controller. In the embodiment illustrated in FIG. 4, the hypervisor 150 may intercept or trap interrupt requests sent to the operating system 112 by the interrupt controller component(s) 142 over the conductor(s) 124 and implement the timer component(s) 140 as one or more virtual or software components. As mentioned herein, the processor(s) 110 may receive the clock signal from the clock signal source 114. The hypervisor 150 may use the clock signal to determine when the timer component(s) 140 indicate the predetermined amount(s) of time 136 have/has elapsed (e.g., counted down). Whenever this occurs, the hypervisor 150 may generate the deadline-expired event 154 and send it to the expired deadline handler 116. On the other hand, after the operating system 112 handles a particular one of the interrupt requests, the operating system 112 may send a first signal from the conductor(s) 134 to the interrupt controller component(s) 142 and the operating system 112 may send a second signal over a communication link 436 to the hypervisor 150. In response to the first signal, the interrupt controller component(s) 142 may clear the particular interrupt request. Referring to FIG. 3, the interrupt controller component(s) 142 may clear the particular interrupt request by clearing a flag in the status register 316. For example, the operating system 112 may clear a flag in the status register 316 or instruct the control logic 320 to clear the flag in the status register 316. In response to the second signal, the hypervisor 150 may stop or deactivate the timer component associated with the particular interrupt request.

Figure 5:
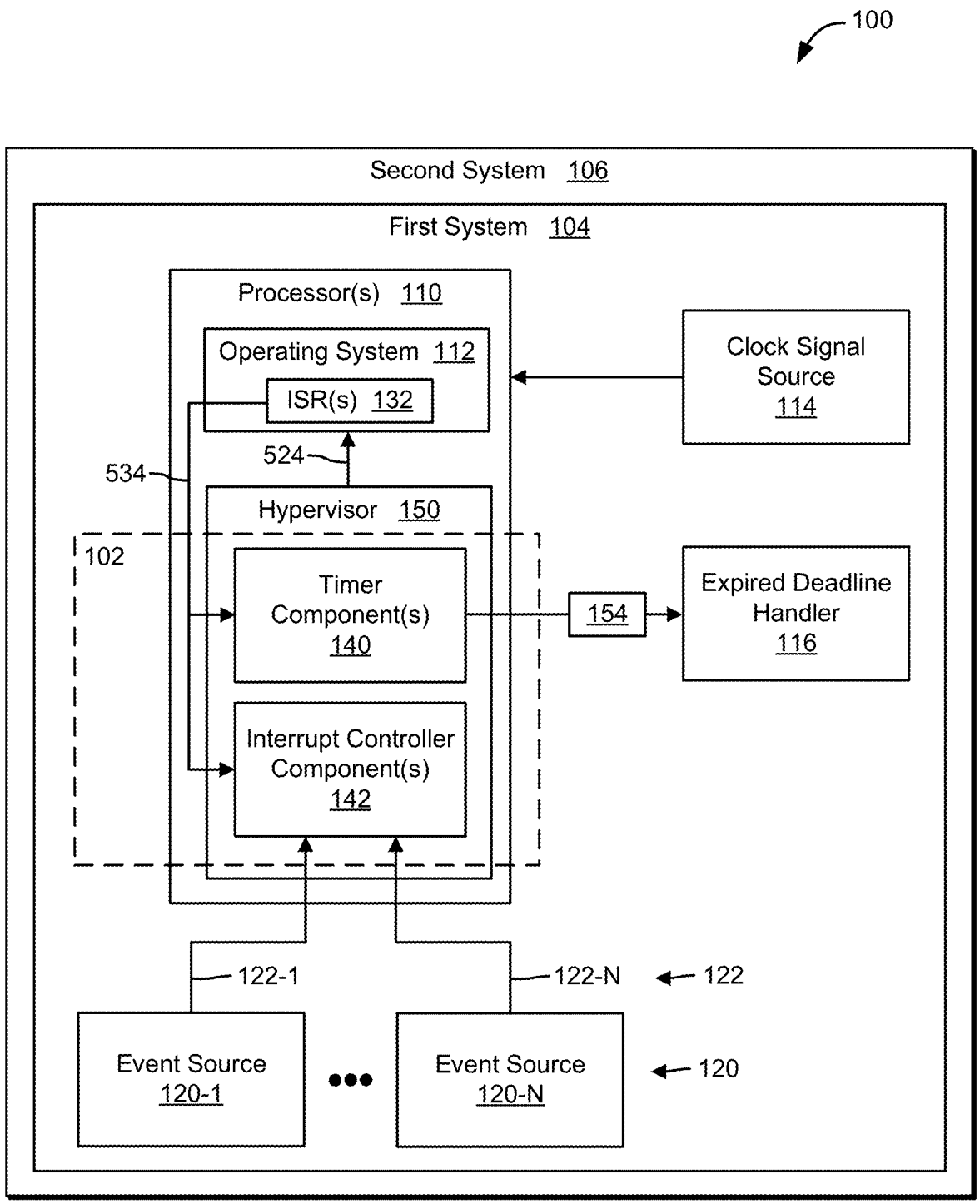
FIG. 5 is an illustration of a block diagram in which the deadline interrupt controller has been implemented as a fully-virtual component, in accordance with some embodiments of the present disclosure.

FIG. 5 is an illustration of a block diagram in which the deadline interrupt controller 102 has been implemented as a fully-virtual component, in accordance with some embodiments of the present disclosure. In the embodiment illustrated in FIG. 5, the hypervisor 150 may implement the timer component(s) 140 and the interrupt controller component(s) 142 as one or more virtual or software components. In the embodiment illustrated in FIG. 5, interrupt requests are sent by the event sources 120 over the conductor(s) 122 to the processor(s) 110. The hypervisor 150 receives (e.g., intercepts or traps) the interrupt requests sent to the processor(s) 110. In this embodiment, referring to FIG. 3, the interrupt controller component(s) 142 may include virtual components that provide functionality substantially identical to that provided by the hardware components of the interrupt controller 300 (e.g., the interrupt register 310, the priority register 312, the interrupt vector 314, the status register 316, the mask register 318, the control logic 320, and the internal data bus(es) 322). Further, the operating system 112 may interact with the timer component(s) 140 and the interrupt controller component(s) 142 in the same manner that the operating system 112 interacts with these components in other embodiments. For example, after the hypervisor 150 receives an interrupt request, the interrupt controller component(s) 142 implemented by the hypervisor 150 forwards the interrupt request to the operating system 112 over one or more communication connections 524. Then, after the operating system 112 handles the interrupt request, the operating system 112 may send a signal over one or more communication connections 534 to the hypervisor 150. The signal causes the interrupt controller component(s) 142 implemented by the hypervisor 150 to clear the interrupt request. The signal may also cause the hypervisor 150 to stop or deactivate the timer component associated with the interrupt request. As mentioned herein, the processor(s) 110 may receive the clock signal from the clock signal source 114. The hypervisor 150 may use the clock signal to determine when the timer component(s) 140 indicate the predetermined amount(s) of time 136 have/has elapsed (e.g., counted down). Whenever this occurs, the hypervisor 150 may generate the deadline-expired event 154 and send it to the expired deadline handler 116.

Figure 6:
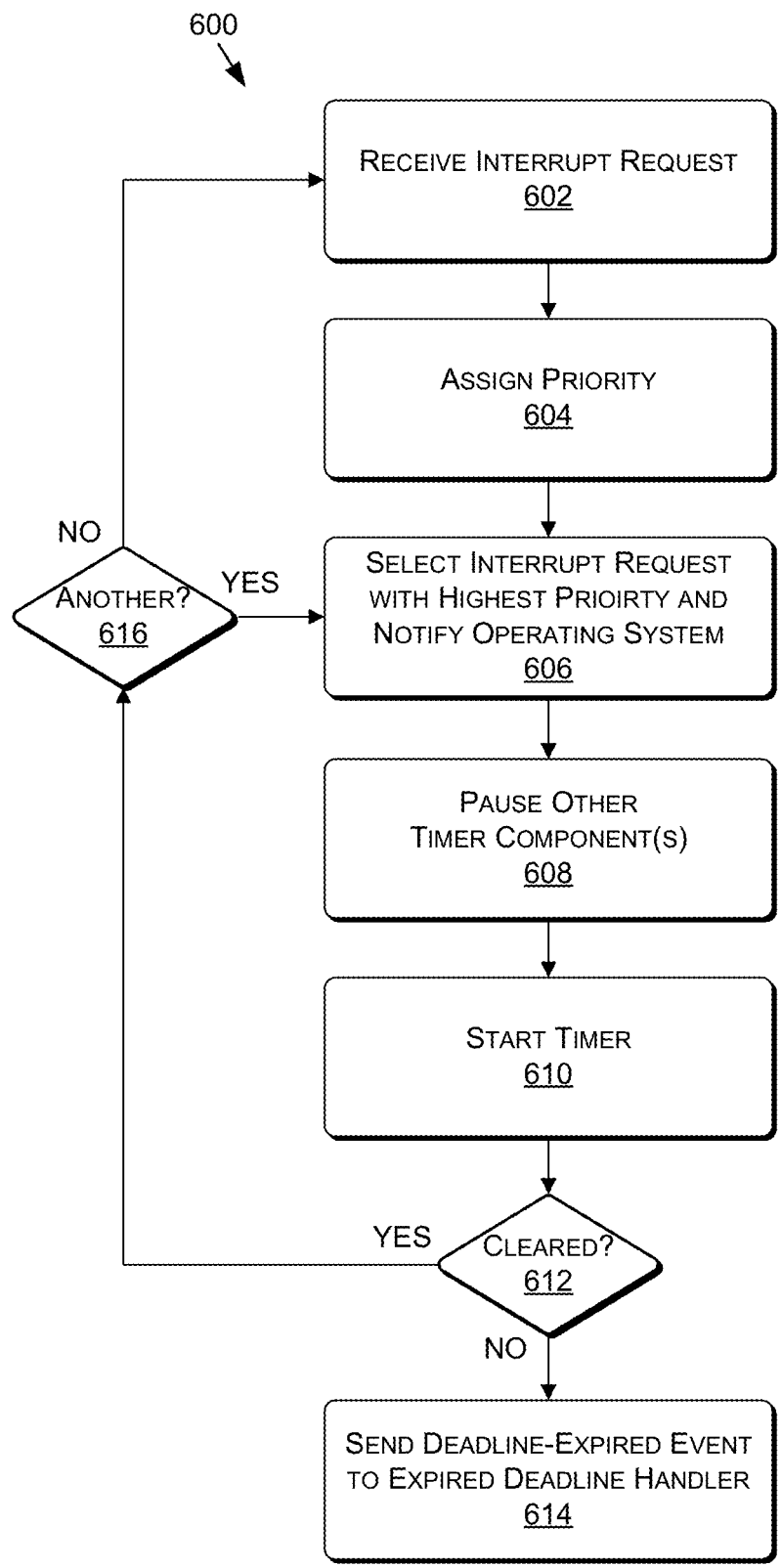
FIG. 6 is an illustration of a flow diagram showing a method of processing interrupt requests that may be performed by the deadline interrupt controller of FIGS. 1, 4, and 5, in accordance with some embodiments of the present disclosure.

Now referring to FIG. 6, each block of a method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, the method 600 is described, by way of example, with respect to the system 100 of FIG. 1. However, these methods may additionally or alternatively be executed by any one system, or any combination of systems, including, but not limited to, those described herein.

FIG. 6 is an illustration of a flow diagram showing a method 600 of processing interrupt requests that may be performed by the deadline interrupt controller 102 (see FIGS. 1-5), in accordance with some embodiments of the present disclosure. Referring to FIG. 6, in block 602, the deadline interrupt controller 102 receives an interrupt request from one of the event sources 120 (see FIGS. 1-5). In block 602, at least one of the interrupt controller component(s) 142 and one of the timer component(s) 140 receive the interrupt request. Referring to FIG. 2, for ease of illustration, the interrupt controller component(s) 142 and the timer component 140-2 will be described as receiving the interrupt request 200-2 from the event source 120-2 in block 602 (see FIG. 6). In block 604 (see FIG. 6), the deadline interrupt controller 102 (see FIGS. 1-5) assigns a priority to or associates a priority with the interrupt request 200-2. Blocks 602 and 604 (see FIG. 6) may be performed whenever the deadline interrupt controller 102 receives a new interrupt request.

In block 606 (see FIG. 6), if the operating system 112 is able to process another interrupt request, the deadline interrupt controller 102 selects the interrupt request (e.g., the interrupt request 200-2) having the highest priority and the notifies the operating system 112 of the interrupt request. For example, the deadline interrupt controller 102 may forward information based at least in part on the interrupt request 200-2 to the operating system 112. After block 606, the operating system 112 should begin handling the interrupt request 200-2. Block 606 may be performed whenever the operating system 112 is able to process another interrupt request.

In block 608 (see FIG. 6), the deadline interrupt controller 102 may pause any of the timer component(s) 140 that are not associated with the interrupt request selected in block 606 (e.g., interrupt request 200-2). For example, the timer component associated with the interrupt request selected in block 606 may pause the other timer components. The paused timer component(s) may each wait until an interrupt request associated with the paused timer component is selected in block 606. Thus, the timer component associated with the higher priority interrupt request selected in block 606 may cause one of the paused timer components to un-pause (or resume counting down) when the timer component associated with the interrupt request selected in block 606 is stopped or deactivated by clearance of the higher priority interrupt request.

In block 610 (see FIG. 6), the deadline interrupt controller 102 activates or starts the timer component (e.g., the timer component 140-2) associated with the interrupt request selected in block 606 (see FIG. 6). As mentioned herein, the timer component 140-2 may receive a predetermined amount of time from the hypervisor 150, which may operate within a safe context having a desired safety level (e.g., ASIL-D). The timer component 140-2 may store the predetermined amount of time in a first memory location (e.g., a deadline register). In block 610, the deadline interrupt controller 102 may set an initial value (e.g., stored in a second memory location, such as a countdown register) of the timer component 140-2 equal to the predetermined amount of time (e.g., stored in the first memory location). Then, the timer component 140-2 may be begin counting down from the initial value until zero is reached at which time the timer component 140-2 has lapsed. The conductor(s) 122 may each be described as being an input line to the deadline interrupt controller 102, which may be described as being "triggered" by an interrupt request. When an input line (e.g., the conductor 122-2) is triggered, the initial value of the timer component 140-2 is reloaded (e.g., into the second memory location) from the first memory location (e.g., a deadline register) and the countdown begins.

At block 612 (see FIG. 6), the deadline interrupt controller 102 determines whether the operating system 112 cleared the interrupt request 200-2 before the timer component 140-2 lapsed. The decision in decision block 612 is "YES," when the operating system 112 cleared the interrupt request 200-2 before the timer component 140-2 lapsed. Otherwise, the decision in decision block 612 is "NO." By way of a non-limiting example, the operating system 112 may fail to clear the interrupt request 200-2 before the timer component 140-2 lapses if a portion of memory storing instructions and/or data related to handling the particular interrupt request has been corrupted (e.g., overwritten). Thus, by detecting that the first system 104 is exhibiting unexpected behavior, the deadline interrupt controller 102 may detect this corruption.

When the decision in decision block 612 is "NO," in block 614 (see FIG. 6), the deadline interrupt controller 102 generates the deadline-expired event 154 and sends it to the expired deadline handler 116 (see FIGS. 1, 4, and 5). At this point, the method 600 (see FIG. 6) may terminate or the deadline interrupt controller 102 may advance to decision block 616 (see FIG. 6). The expired deadline handler 116 may take one or more corrective action after receiving the deadline-expired event 154.

On the other hand, when the decision in decision block 612 (see FIG. 6) is "YES," the deadline interrupt controller 102 advances to decision block 616 (see FIG. 6). In decision block 616, the deadline interrupt controller 102 determines whether the deadline interrupt controller 102 is storing any interrupt requests about which the operating system 112 has not been notified. The decision in decision block 616 is "YES," when the deadline interrupt controller 102 is storing at least one such interrupt request. Otherwise, the decision in decision block 616 is "NO." When the decision in decision block 616 is "NO," the deadline interrupt controller 102 returns to block 602 (see FIG. 6) to receive one or more new interrupt requests. When the decision in decision block 616 is "YES," the deadline interrupt controller 102 returns to block 606 (see FIG. 6) to select one of the stored interrupt request(s) and forward it to the operating system 112.

FIGS. 7A-7D illustrate an example autonomous vehicle 700 that includes one or more sensors (e.g., one or more cameras, one or more proximity sensors, and/or the like). The vehicle 700 processes a large amount of sensor data received from the sensor(s) to perceive its surroundings in real-time and enable autonomous driving functions (e.g., Advanced Driver Assistance Systems ("ADAS") functions). One or more of the event sources 120 (see FIGS. 1-5) may be implemented as or connected to one or more of the sensor(s) of the vehicle 700. In such embodiments, those of the event sources 120 implemented by or connected to one or more of the sensor(s) may generate an interrupt request based at least in part on sensor data. For example, those of the event sources 120 implemented by or connected to one or more of the sensor(s) may generate interrupt requests when particular criteria is satisfied.

Referring to FIGS. 1, 4, and 5, the deadline interrupt controller 102 may receive the interrupt requests from the event sources 120, forward the interrupt requests to the operating system 112, and send a deadline-expired event to the expired deadline handler 116 when the operating system 112 has failed to handle any of the interrupt requests within an applicable predetermined amount of time, as discussed above. The operating system 112 may use the interrupt requests to perform ADAS functions, such as Autonomous Emergency Braking ("AEB"), Lane Keeping Assistance ("LKA"), Traffic Jam Assistance ("TJA"), and/or the like. Thus, if the operating system 112 were to fail to handle an interrupt request used to perform a particular ADAS function, the particular ADAS function may not function properly. The expired deadline handler 116 may take one or more corrective actions when the expired deadline handler 116 receives a deadline-expired event (e.g., the deadline-expired event 154). For example, the expired deadline handler 116 may return the vehicle 700 to a safe state. By way of a non-limiting example, the expired deadline handler 116 may return the vehicle 700 to a safe state by returning control of the vehicle 700 to a human driver.

Example Autonomous Vehicle

Figure 7A:
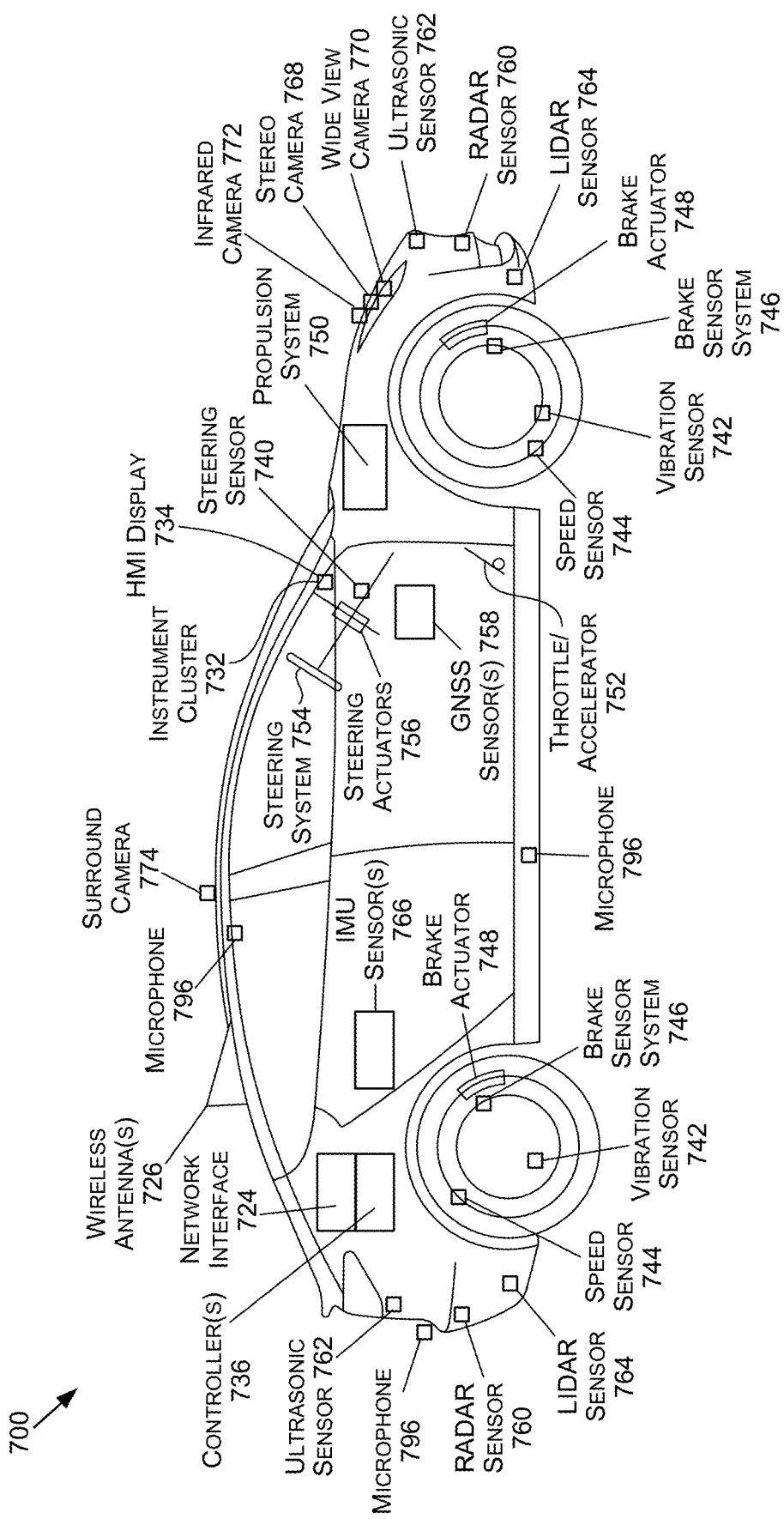
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. For example, the vehicle 700 may be capable of conditional automation (Level 3), high automation (Level 4), and/or full automation (Level 5), depending on the embodiment.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more CPU(s), system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, and/or to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) 746 (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the location of the vehicle 700, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724, which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee etc., and/or low power wide-area network(s) (LPWANs), such as LoRaWAN, SigFox, etc.

Figure 7B:
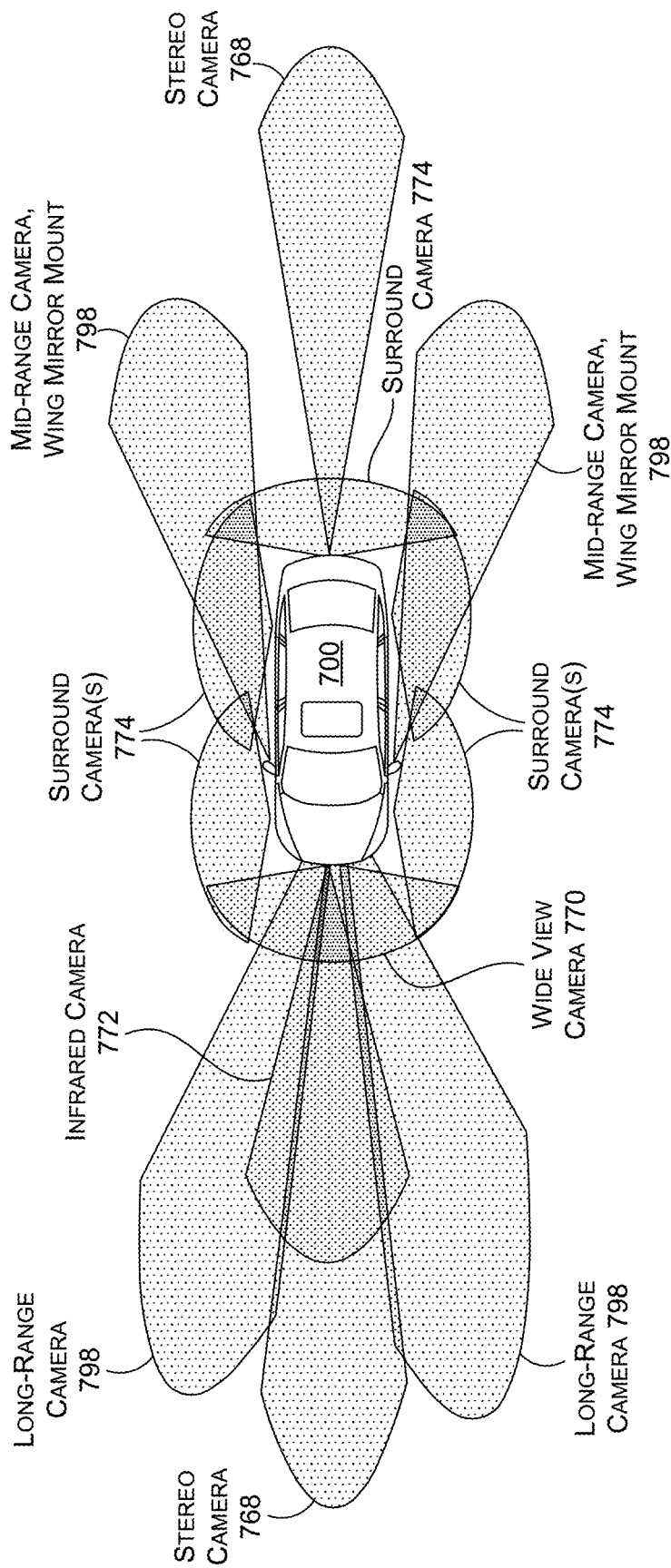
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 700 (e.g., front-facing cameras) may be used for surround view, to help identify forward-facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that includes portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned around the vehicle 700. The surround camera(s) 774 may include wide-view camera(s) 770, fisheye camera(s), 360-degree camera(s), and/or the like. For example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround-view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
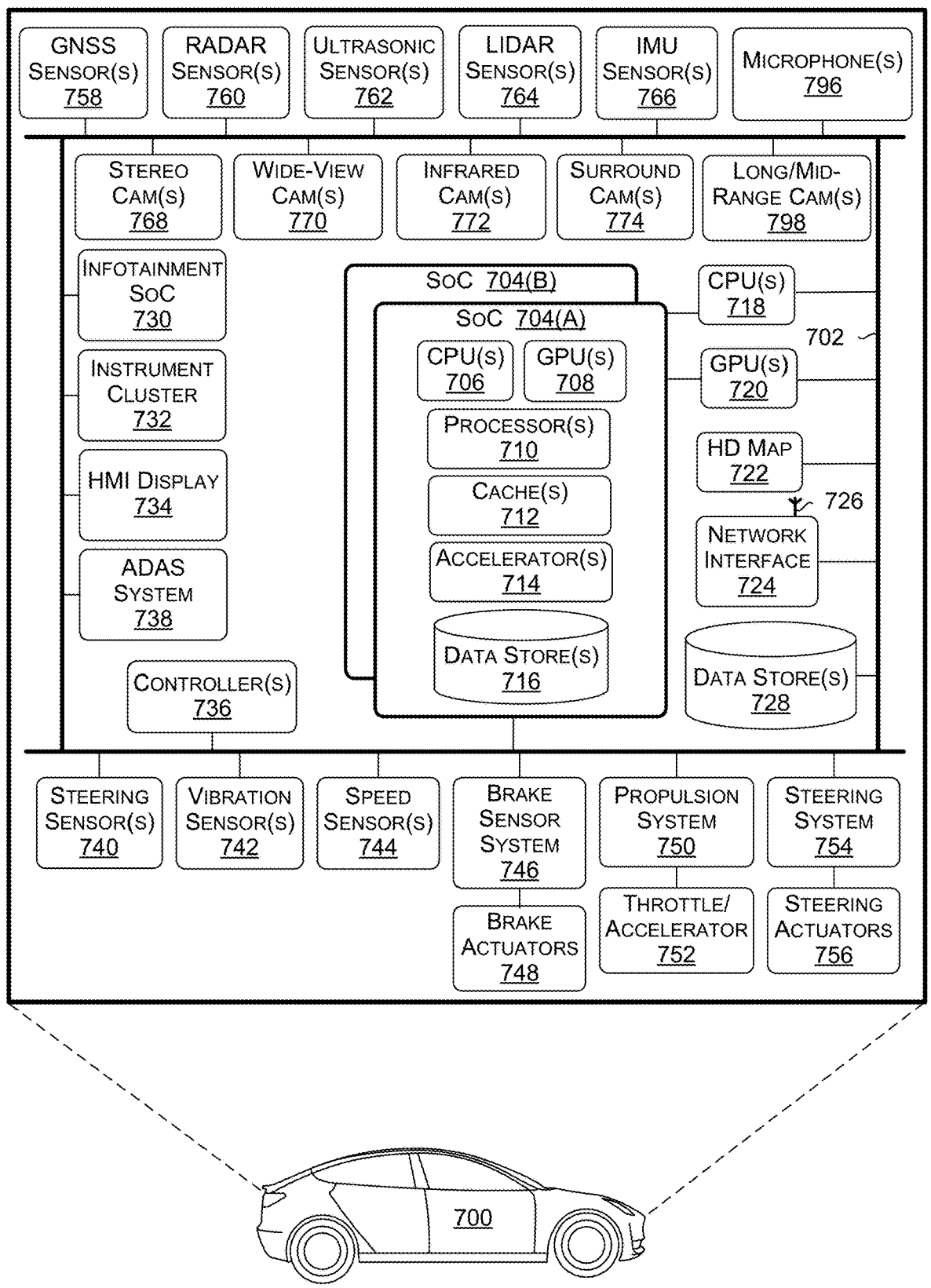
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C is illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700 and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use computer-based application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting, and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected to both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 716 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe-stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and actively performing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758

(e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always-on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, which use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include an SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728, which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758 (e.g., GPS and/or assisted GPS sensors), to assist in mapping, perception, occupancy grid generation, and/or path planning functions. Any number of GNSS sensor(s) 758 may be used, including, for example and without limitation, a GPS using a USB connector with an Ethernet to serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data, in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 700 at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 100 m, with an accuracy of 2 cm-3 cm, and with support for a 100 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include an SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjusts the vehicle speed to maintain a safe distance from vehicles ahead. Lateral ACC performs distance keeping, and advises the vehicle 700 to change lanes when necessary. Lateral ACC is related to other ADAS applications such as LC and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 700), while the I2V communication concept provides information about traffic farther ahead. CACC systems may include either or both I2V and V2V information sources. Given the information of the vehicles ahead of the vehicle 700, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network that is trained and thus reduces the risk of false positives, as described herein.

The vehicle 700 may further include the infotainment SoC 730 (e.g., an in-vehicle infotainment system (IVI)). Although illustrated and described as an SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 700. For example, the infotainment SoC 730 may include radios, disk players, navigation systems, video players, USB and Bluetooth connectivity, carputers, in-car entertainment, Wi-Fi, steering wheel audio controls, hands-free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe-stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
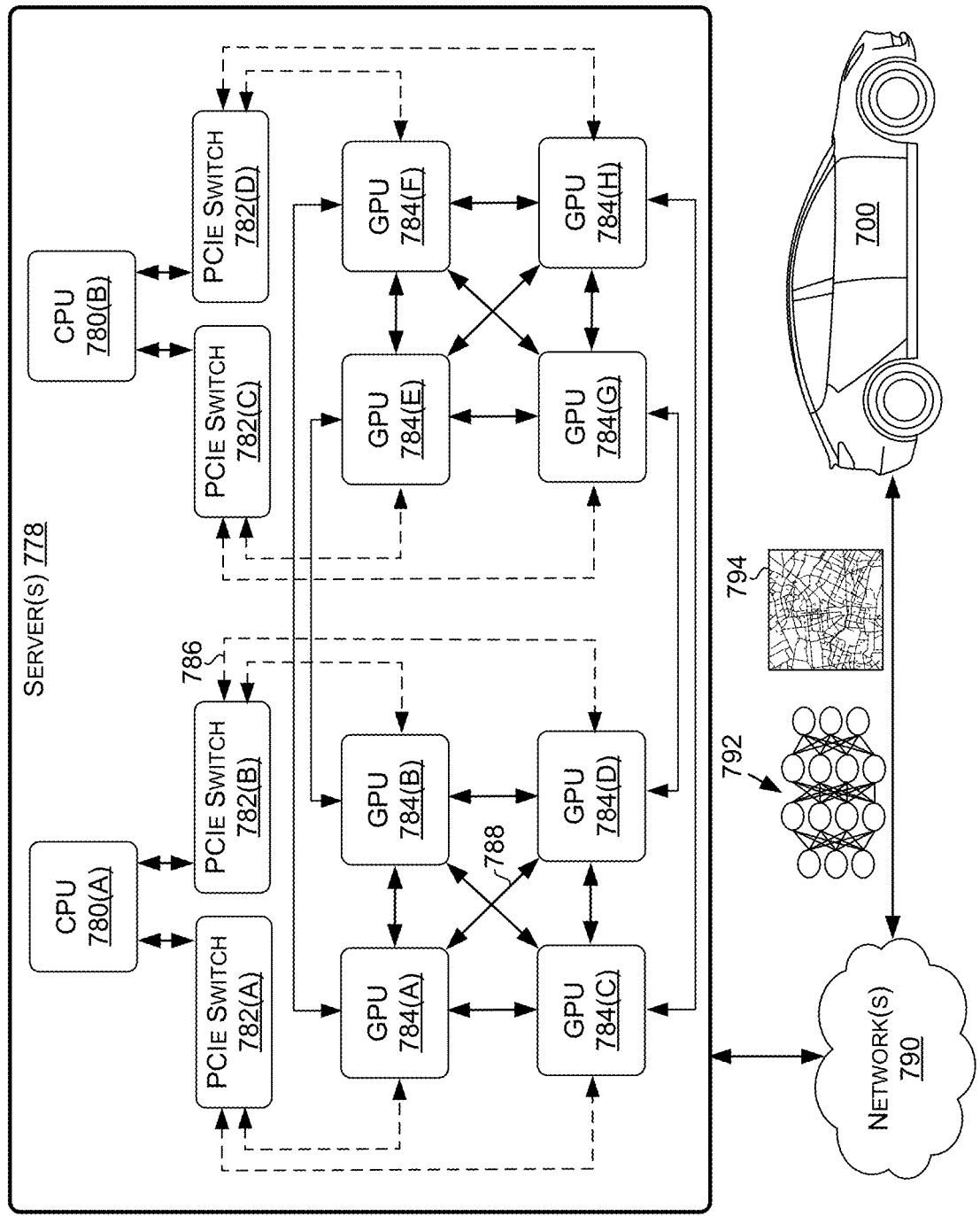
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced roadwork. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

As mentioned herein, in at least one embodiment, the deadline interrupt controller 102 (see FIGS. 1-5) may be a component of the vehicle 700. In such embodiments, the second system 106 (see FIGS. 1, 4, and 5) may be implemented as the vehicle 700 and the first system 104 (see FIGS. 1, 2, 4, and 5) may be implemented as one of the SoCs 704 (see FIG. 7C). Referring to FIG. 7C, the processor(s) 110 (see FIGS. 1-5) may be implemented by the CPU(s) 706, the GPU(s) 708, and/or the processor(s) 710. The event sources 120 (see FIGS. 1-5) may be implemented as or connected to any of the sensors described above.

Example Computing Device

Figure 8:
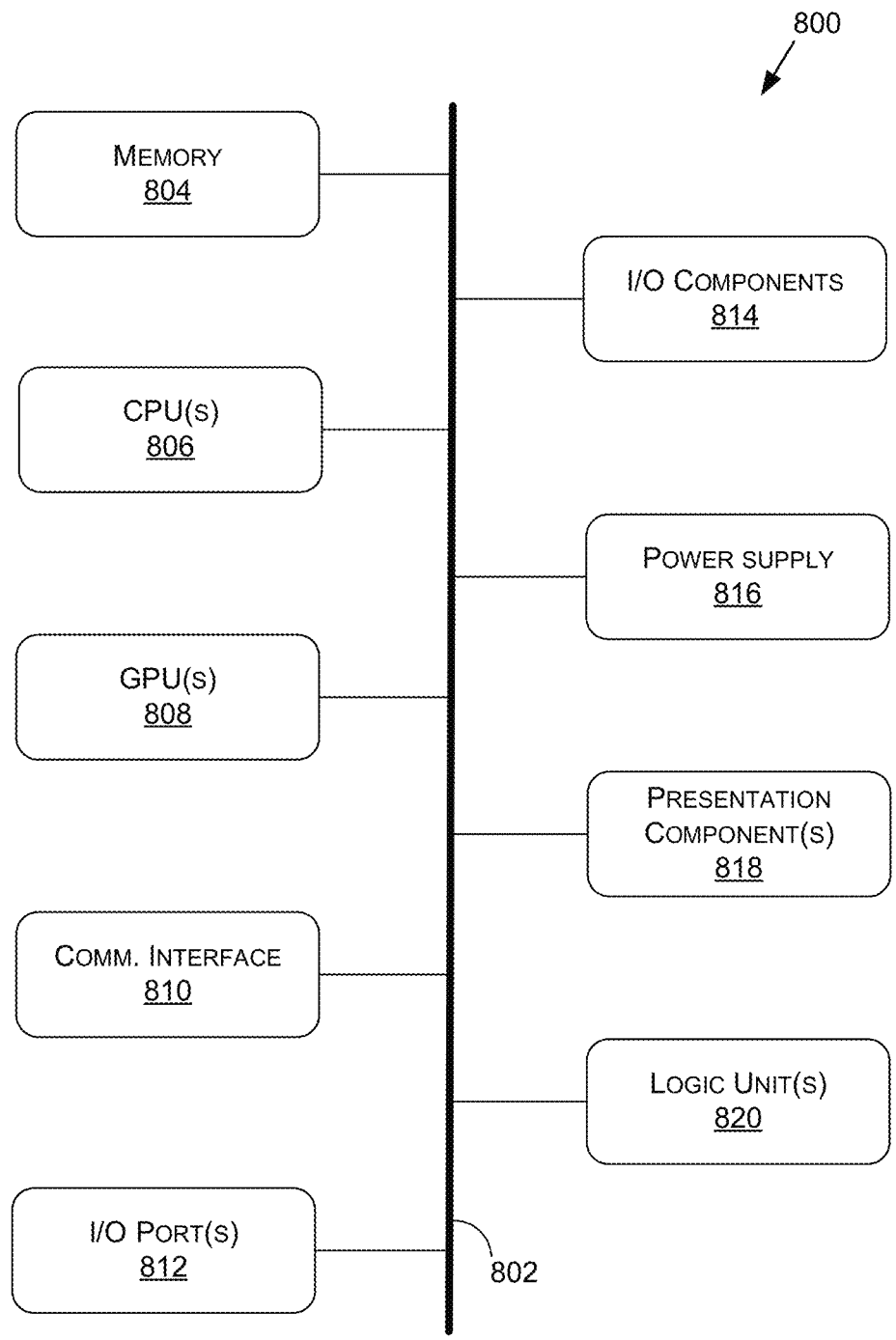
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, I/O ports 812, input/output components 814, a power supply 816, one or more presentation components 818 (e.g., display(s)), and one or more logic units 820.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point, connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, including wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built into (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

In at least one embodiment, the operating system 112 (see FIGS. 1, 2, 4, and 5) and/or the hypervisor 150 (see FIGS. 1, 4, and 5) may be implemented on one of the computing device(s) 800. As mentioned herein, the operating system 112 and/or the hypervisor 150 may be implemented by processor executable instructions. In such embodiments, the instructions may be stored by the memory 804 and executed by the CPUs 806, the GPUs 808, and/or the logic unit(s) 820.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

At least one embodiment of the disclosure can be described in view of the following clauses:

1. A system comprising: an interrupt controller component to receive an interrupt request; and a timer component to generate an event when the interrupt request has not yet been cleared within at least a predetermined amount of time.
2. The system of clause 1, further comprising: at least one processor to implement an operating system operating at a first risk classification level, the operating system to clear the interrupt request from the interrupt controller component, wherein the operating system, the interrupt controller component, and the timer component collectively operate at a second risk classification level that indicates a lower level of risk than the first risk classification level.
3. The system of clause 2, wherein the interrupt controller component is implemented as a hardware circuit, and timer component is implemented using a virtual machine manager, the virtual machine manager being implemented using the at least one processor.
4. The system of clause 2, wherein the at least one processor is further to implement a virtual machine manager that implements at least one of the timer component or the interrupt controller component.
5. The system of clause 2, further comprising: a hardware circuit having first and second portions, the interrupt controller component being implemented as the first portion and the timer component being implemented as the second portion.
6. The system of any of the clauses 2-5, further comprising: an event handler operating at the second risk classification level, the timer component to communicate the event to the event handler, the event handler to perform at least one corrective action or cause the at least one corrective action to be performed after the event handler receives the event.
7. The system of clause 6, wherein the at least one processor is further to implement a virtual machine manager that implements the event handler.
8. The system of clause 6 or 7, further comprising: a non-maskable interrupt line, the event to be communicated to the operating system over the non-maskable interrupt line, and the operating system to implement the event handler.
9. The system of any of the clauses 1-8, wherein the timer component is a first timer component, the interrupt request is a first interrupt request associated with a first priority, the predetermined amount of time is a first predetermined amount of time, the interrupt controller component is to receive a second interrupt request associated with a second priority before the interrupt controller component receives the first interrupt request, the first priority is greater than the second priority, and the system further comprises a second timer component to determine when the second interrupt request has not yet been cleared within at least a second predetermined amount of time, the first timer component to cause the second timer component to pause when the first timer component receives the first interrupt request, the first timer component to cause the second timer component to resume when the first interrupt request has been cleared from the interrupt controller component.

10. The system of any of the clauses 1-9, further comprising: a System on a Chip ("SoC") comprising the interrupt controller component and the timer component.

11. The system of clause 10, wherein the system is at least one of an autonomous machine or a semi-autonomous machine, and the at least one of the autonomous machine or the semi-autonomous machine further comprises: an event source to send the interrupt request to the interrupt controller component, the event source comprising or being connected to at least one sensor, the event source to generate the interrupt request when the at least one sensor indicates criteria has been satisfied.

12. A method comprising: notifying an interrupt handler of an interrupt request; starting a timer component based at least in part on the interrupt request; and generating an event when the timer component indicates at least a predetermined amount of time has elapsed and the interrupt handler has not cleared the interrupt request.

13. The method of clause 12, further comprising: receiving a second interrupt request, the interrupt request being a first interrupt request, the first and second interrupt requests having first and second priorities, respectively, wherein the first priority is greater than the second priority, the timer component being a first timer component; and pausing a second timer component associated with the second interrupt request.

14. The method of clause 12 or 13, wherein the interrupt request is received by an interrupt controller component that notifies the interrupt handler of the interrupt request; and the interrupt handler attempts to handle the interrupt request before the event is generated.

15. The method of clause 14, wherein the interrupt handler is an operating system operating at a first risk classification level, and the operating system, the interrupt controller component, and the timer component collectively operate at a second risk classification level that indicates a lower level of risk than the first risk classification level.

16. The method of clause 15, further comprising: sending the event to an event handler that operates at the second risk classification level.

17. The method of any of the clauses 14-16, wherein the timer component is implemented using a virtual machine manager, and the interrupt controller component is implemented using a hardware circuit.

18. The method of any of the clauses 14-16, wherein the timer component and the interrupt controller component are both implemented using at least one of a virtual machine manager or a hardware circuit.

19. The method of any of the clauses 12-18, further comprising: sending the event to an event handler that is implemented using a virtual machine manager.

20. The method of any of the clauses 12-19, wherein the interrupt handler is implemented using an operating system, and the method further comprises: sending the event to the operating system over a non-maskable interrupt line; and performing, using the operating system, at least one corrective action in response to the event.

21. The method of any of the clauses 12-20, further comprising: sending the event to an event handler; and performing, using the event handler, at least one corrective action in response to the event.

22. The method of any of the clauses 12-21, wherein the timer component and the interrupt handler are components of an autonomous machine or a semi-autonomous machine, and the method further comprises, sending the event to an event handler; and returning, at least in part using the event handler, the autonomous machine or the semi-autonomous machine to a safe state in response to the event.

23. The method of any of the clauses 12-22, further comprising: generating, using an event source, the interrupt request when at least one sensor of the event source or connected to the event source indicates criteria has been satisfied; and sending, using the event source, the interrupt request to an interrupt controller component that receives the interrupt request and notifies the interrupt handler of the interrupt request, the interrupt handler to attempt to handle the interrupt request before the event is generated.

24. The method of any of the clauses 12-23, further comprising: stopping the timer component when the interrupt handler clears the interrupt request before the predetermined amount of time has elapsed.

25. The method of any of the clauses 12-24, further comprising: receiving the predetermined amount of time from a configuration component; storing the predetermined amount of time using a first memory location; and loading the predetermined amount of time into a second memory location from the first memory location before starting the timer component.

26. The method of clause 25, wherein the configuration component is a virtual machine manager.

27. A system comprising: at least one processor to implement an interrupt handler by executing instructions stored in a non-transitory processor-readable media; an interrupt controller component to communicate a particular one of a plurality of interrupt requests to the interrupt handler; and a plurality of timer components, a particular one of the plurality of timer components being associated with a predetermined amount of time, the particular timer component to generate an event when the interrupt handler has not handled the particular interrupt request within at least the predetermined amount of time associated with the particular timer component.

28. The system of clause 27, wherein the interrupt handler comprises an operating system or at least one interrupt service routine.

29. The system of clause 27 or 28, further comprising: a circuit comprising the interrupt controller component; a plurality of event sources to transmit the plurality of interrupt requests to the interrupt controller component; and at least one sensor to generate sensor data, the plurality of event sources to generate the plurality of interrupt requests when the sensor data satisfies criteria.

30. The system of clause 29, wherein the circuit comprises the plurality of timer components.

31. The system of any of the clauses 27-30, further comprising: a plurality of event sources to transmit the plurality of interrupt requests to the at least one processor; and at least one sensor to generate sensor data, the plurality of event sources to generate the plurality of interrupt requests when the sensor data satisfies criteria, the at least one processor to implement the plurality of timer components and the interrupt controller component using the instructions stored in the non-transitory processor-readable media.

32. The system of any of the clauses 27-31, wherein the particular interrupt request is associated with a higher priority than at least one interrupt request of a remainder of the plurality of interrupt requests, and the particular timer component is to pause at least one timer component of the plurality of timer components when the particular timer component is activated.

33. The system of clause 32, wherein the particular timer component is to un-pause the at least one timer component when the particular timer component is deactivated.

34. The system of any of the clauses 27-33, further comprising: a System on a Chip ("SoC") comprising the at least one processor, the interrupt controller component, and the plurality of timer components.

35. The system of any of the clauses 27-34, wherein the interrupt handler is to operate at a first risk classification level, and the interrupt handler, the interrupt controller component, and the plurality of timer components collectively operate at a second risk classification level that indicates a lower level of risk than the first risk classification level.

36. The system of clause 35, further comprising: an event handler operating at the second risk classification level, the particular timer component to communicate the event to the event handler, the event handler to perform at least one corrective action or cause the at least one corrective action to be performed after the event handler receives the event.

37. The system of any of the clauses 27-36, further comprising: an event handler to receive the event from the particular timer component and return the system to a safe state in response to the event.

38. The system of any of the clauses 27-37, further comprising: a non-maskable interrupt line, wherein the event is communicated to the interrupt handler over the non-maskable interrupt line.

39. The system of any of the clauses 27-38, wherein the particular timer component is to stop when the interrupt handler clears the particular interrupt request before the predetermined amount of time associated with the particular timer component has elapsed.

40. The system of any of the clauses 27-39, further comprising: a configuration component to send the predetermined amount of time to each of the plurality of timer components.

41. The system of any of the clauses 27-40, wherein the system is comprised in at least one of: a control system for an autonomous or semi-autonomous machine; a perception system for an autonomous or semi-autonomous machine; a first system for performing simulation operations; a second system for performing digital twin operations; a third system for performing deep learning operations; a fourth system implemented using an edge device; a fifth system implemented using a robot; a sixth system incorporating one or more virtual machines ("VMs"); a seventh system implemented at least partially in a data center; an eighth system including a collaborative creation platform for three-dimensional ("3D") content; or a ninth system implemented at least partially using cloud computing resources.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   an interrupt controller component to receive an interrupt request;
   at least one processor to implement an interrupt handler operating at a first risk classification level, the interrupt handler to clear the interrupt request from the interrupt controller component and
   a timer component to generate an event when the interrupt request has not yet been cleared within at least a predetermined amount of time, the interrupt handler, the interrupt controller component, and the timer component collectively to operate at a second risk classification level that indicates a lower level of risk than the first risk classification level.

2. The system of claim 1, wherein the interrupt controller component is implemented as a hardware circuit, and timer component is implemented using a virtual machine manager, the virtual machine manager being implemented using the at least one processor.

3. The system of claim 1, wherein the at least one processor is further to implement a virtual machine manager that implements at least one of the timer component or the interrupt controller component.

4. The system of claim 1, further comprising:
   a hardware circuit having first and second portions, the interrupt controller component being implemented as the first portion and the timer component being implemented as the second portion.

5. The system of claim 1, further comprising:
   an event handler operating at the second risk classification level, the timer component to communicate the event to the event handler, the event handler to perform at least one corrective action or cause the at least one corrective action to be performed after the event handler receives the event.

6. The system of claim 5, wherein the at least one processor is further to implement a virtual machine manager that implements the event handler.

7. The system of claim 5, further comprising:
a non-maskable interrupt line, the event to be communicated to the operating system over the non-maskable interrupt line, and the operating system to implement the event handler.

8. The system of claim 1, wherein the timer component is a first timer component,
the interrupt request is a first interrupt request associated with a first priority,
the predetermined amount of time is a first predetermined amount of time,
the interrupt controller component is to receive a second interrupt request associated with a second priority before the interrupt controller component receives the first interrupt request,
the first priority is greater than the second priority, and
the system further comprises a second timer component to determine when the second interrupt request has not yet been cleared within at least a second predetermined amount of time, the first timer component to cause the second timer component to pause when the first timer component receives the first interrupt request, the first timer component to cause the second timer component to resume when the first interrupt request has been cleared from the interrupt controller component.

9. The system of claim 1, further comprising:
a System on a Chip ("Sort") comprising the interrupt controller component and the timer component.

10. The system of claim 9, wherein the system is at least one of an autonomous machine or a semi-autonomous machine, and the at least one of the autonomous machine or the semi-autonomous machine further comprises:
an event source to send the interrupt request to the interrupt controller component, the event source comprising or being connected to at least one sensor, the event source to generate the interrupt request when the at least one sensor indicates criteria has been satisfied.

11. A method comprising:
notifying an interrupt handler of an interrupt request wherein the interrupt handler is operating at a first risk classification level, the interrupt handler to clear the interrupt request;
starting a timer component based at least in part on the interrupt request; and
generating an event when the timer component indicates at least a predetermined amount of time has elapsed and the interrupt handler has not cleared the interrupt request, the interrupt handler and the timer component collectively operating at a second risk classification level that indicates a lower level of risk than the first risk classification level.

12. The method of claim 11, further comprising:
receiving a second interrupt request, the interrupt request being a first interrupt request, the first and second interrupt requests having first and second priorities, respectively, wherein the first priority is greater than the second priority, the timer component being a first timer component; and
pausing a second timer component associated with the second interrupt request.

13. The method of claim 11, wherein the interrupt request is received by an interrupt controller component that notifies the interrupt handler of the interrupt request; and
the interrupt handler attempts to handle the interrupt request before the event is generated.

14. The method of claim 11, further comprising:
sending the event to an event handler that operates at the second risk classification level.

15. The method of claim 13, wherein the timer component is implemented using a virtual machine manager, and
the interrupt controller component is implemented using a hardware circuit.

16. The method of claim 13, wherein the timer component and the interrupt controller component are both implemented using at least one of a virtual machine manager or a hardware circuit.

17. The method of claim 11, further comprising:
sending the event to an event handler that is implemented using a virtual machine manager.

18. The method of claim 11, wherein the interrupt handler is implemented using an operating system, and the method further comprises:
sending the event to the operating system over a non-maskable interrupt line; and
performing, using the operating system, at least one corrective action in response to the event.

19. The method of claim 11, further comprising:
sending the event to an event handler; and
performing, using the event handler, at least one corrective action in response to the event.

20. The method of claim 11, wherein the timer component and the interrupt handler are components of an autonomous machine or a semi-autonomous machine, and the method further comprises:
sending the event to an event handler; and
returning, at least in part using the event handler, the autonomous machine or the semi-autonomous machine to a safe state in response to the event.

21. The method of claim 11, further comprising:
generating, using an event source, the interrupt request when at least one sensor of the event source or connected to the event source indicates criteria has been satisfied; and
sending, using the event source, the interrupt request to an interrupt controller component that receives the interrupt request and notifies the interrupt handler of the interrupt request, the interrupt handler to attempt to handle the interrupt request before the event is generated.

22. The method of claim 11, further comprising:
stopping the timer component when the interrupt handler clears the interrupt request before the predetermined amount of time has elapsed.

23. The method of claim 11, further comprising:
receiving the predetermined amount of time from a configuration component;
storing the predetermined amount of time using a first memory location; and
loading the predetermined amount of time into a second memory location from the first memory location before starting the timer component.

24. The method of claim 23, wherein the configuration component is a virtual machine manager.

25. A system comprising:
at least one processor to implement an interrupt handler by executing instructions stored in a non-transitory processor-readable media;

an interrupt controller component to communicate a particular one of a plurality of interrupt requests to the interrupt handler, the interrupt handler operating at a first risk classification level, the interrupt handler to clear the interrupt request from the interrupt controller component; and a plurality of timer components, a particular one of the plurality of timer components being associated with a predetermined amount of time, the particular timer component to generate an event when the interrupt handler has not handled the particular interrupt request within at least the predetermined amount of time associated with the particular timer component, the interrupt handler, the interrupt controller component, and the particular timer component collectively to operate at a second risk classification level that indicates a lower level of risk than the first risk classification level.

26. The system of claim 25, wherein the interrupt handler comprises an operating system or at least one interrupt service routine.

27. The system of claim 25, further comprising:
a circuit comprising the interrupt controller component;
a plurality of event sources to transmit the plurality of interrupt requests to the interrupt controller component; and
at least one sensor to generate sensor data, the plurality of event sources to generate the plurality of interrupt requests when the sensor data satisfies criteria.

28. The system of claim 27, wherein the circuit comprises the plurality of timer components.

29. The system of claim 25, further comprising:
a plurality of event sources to transmit the plurality of interrupt requests to the at least one processor; and
at least one sensor to generate sensor data, the plurality of event sources to generate the plurality of interrupt requests when the sensor data satisfies criteria, the at least one processor to implement the plurality of timer components and the interrupt controller component using the instructions stored in the non-transitory processor-readable media.

30. The system of claim 25, wherein the particular interrupt request is associated with a higher priority than at least one interrupt request of a remainder of the plurality of interrupt requests, and
the particular timer component is to pause at least one timer component of the plurality of timer components when the particular timer component is activated.

31. The system of claim 30, wherein the particular timer component is to un-pause the at least one timer component when the particular timer component is deactivated.

32. The system of claim 25, further comprising:
a System on a Chip ("Sort") comprising the at least one processor, the interrupt controller component, and the plurality of timer components.

33. The system of claim 25, further comprising:
an event handler operating at the second risk classification level, the particular timer component to communicate the event to the event handler, the event handler to perform at least one corrective action or cause the at least one corrective action to be performed after the event handler receives the event.

34. The system of claim 25, further comprising:
an event handler to receive the event from the particular timer component and return the system to a safe state in response to the event.

35. The system of claim 25, further comprising:
a non-maskable interrupt line, wherein the event is communicated to the interrupt handler over the non-maskable interrupt line.

36. The system of claim 25, wherein the particular timer component is to stop when the interrupt handler clears the particular interrupt request before the predetermined amount of time associated with the particular timer component has elapsed.

37. The system of claim 25, further comprising:
a configuration component to send the predetermined amount of time to each of the plurality of timer components.

38. The system of claim 25, wherein the system is comprised in at least one of: a control system for an autonomous or semi-autonomous machine;
a perception system for an autonomous or semi-autonomous machine;
a first system for performing simulation operations;
a second system for performing digital twin operations;
a third system for performing deep learning operations;
a fourth system implemented using an edge device;
a fifth system implemented using a robot;
a sixth system incorporating one or more virtual machines ("VMs");
a seventh system implemented at least partially in a data center;
an eighth system including a collaborative creation platform for three-dimensional ("3D") content; or
a ninth system implemented at least partially using cloud computing resources.

39. A system comprising:
an interrupt controller component to receive an interrupt request;
at least one processor to implement an interrupt handler operating at a first risk classification level defined by an industry safety standard for electrical systems; and
at least one timer component to generate an event when the interrupt request has not yet been cleared within at least a predetermined amount of time, the timer component to operate at a second risk classification level defined by the industry safety standard for electrical systems that indicates a lower level of risk than the first risk classification level.

* * * * *